(12) United States Patent
Fuller et al.

(10) Patent No.: US 6,490,828 B1
(45) Date of Patent: Dec. 10, 2002

(54) PARTITION WALL SYSTEM

(75) Inventors: Christopher S. Fuller, Grand Rapids; Arnold A. Krumrie, Alto; Mark C. Volesky, Belding, all of MI (US)

(73) Assignee: Steelcase Development Corporation, Grand Rapids, MI (US)

( * ) Notice: Subject to any disclaimer, the term of this patent is extended or adjusted under 35 U.S.C. 154(b) by 0 days.

(21) Appl. No.: 09/619,874

(22) Filed: Jul. 20, 2000

(51) Int. Cl.$^7$ ................................................ A47F 10/00
(52) U.S. Cl. ........................... 52/36.1; 52/624; 52/391; 52/309.12; 52/309.16; 428/107; 428/703; 478/74; 156/471
(58) Field of Search ............................... 52/36.1; 1/239; 428/182

(56) References Cited

U.S. PATENT DOCUMENTS

| | | | |
|---|---|---|---|
| 2,465,319 A | 3/1949 | Whinfield | 260/75 |
| 3,313,674 A | 4/1967 | Mathews | 161/96 |
| 3,327,442 A | 6/1967 | Hermann | 52/309 |
| 3,430,405 A | 3/1969 | Alder et al. | 52/573 |
| 3,538,664 A | 11/1970 | Frandsen et al. | 52/309 |
| 3,708,380 A | 1/1973 | Niebylski | 161/43 |
| 3,713,474 A | 1/1973 | Orlando | 160/351 |
| 3,859,401 A | 1/1975 | Gallap et al. | 264/45.3 |
| 3,871,153 A | * 3/1975 | Birum, Jr. | 52/624 |
| 3,872,640 A | 3/1975 | Megumi | 52/586 |
| 3,948,347 A | 4/1976 | Rutledge | 181/33 G |
| 4,076,886 A | 2/1978 | Corcoran | 428/294 |
| 4,130,233 A | 12/1978 | Chisholm | 228/126 |
| 4,155,211 A | 5/1979 | Saylor et al. | 52/809 |
| 4,157,415 A | 6/1979 | Lindenberg | 428/284 |
| 4,213,493 A | 7/1980 | Haworth | 160/351 |
| 4,223,068 A | 9/1980 | Carlstrom et al. | 428/310 |
| 4,241,131 A | 12/1980 | Bailey | 428/262 |
| 4,276,346 A | 6/1981 | Bramwell | 428/286 |
| 4,297,821 A | 11/1981 | Peters | 52/317 |
| 4,353,955 A | 10/1982 | Cook | 428/246 |
| 4,363,684 A | 12/1982 | Hay, II | 156/201 |
| 4,391,073 A | 7/1983 | Mollenkopf et al. | 52/241 |
| 4,423,573 A | 1/1984 | Omholt et al. | 52/145 |
| 4,433,021 A | 2/1984 | Riel | 428/116 |
| 4,455,802 A | 6/1984 | Charniga | 52/317 |
| 4,476,183 A | 10/1984 | Holtrop et al. | 428/286 |
| 4,486,478 A | 12/1984 | Madonia et al. | 428/31 |
| 4,493,806 A | 1/1985 | Hatzikelis et al. | 264/28 |
| 4,545,283 A | 10/1985 | Sandberg et al. | 87/6 |
| 4,547,426 A | 10/1985 | Montle | 428/377 |
| 4,595,551 A | 6/1986 | Maurer | 264/321 |
| 4,621,013 A | 11/1986 | Holtrop et al. | 528/245 |

(List continued on next page.)

FOREIGN PATENT DOCUMENTS

| WO | WO 00/76700 A1 | 12/2000 |
|---|---|---|
| WO | WO/01/38073 A1 | 5/2001 |

OTHER PUBLICATIONS

Underwriters Laboratories Inc. Standard for Safety "Test for Surface Burning Characteristics of Building Materials," Dated Dec. 24, 1998, Copyright 1998 Underwriters Laboratories, Inc. (36 pages).

"Standard Test Method for Surface Burning Characteristics of Building Materials," Published Aug. 1999, Copyright ASTM (18 pages).

*Primary Examiner*—Carl D. Friedman
*Assistant Examiner*—Steve Varner
(74) *Attorney, Agent, or Firm*—Foley & Lardner (57) ABSTRACT

A panel covering for use in an office environment is disclosed. The panel covering includes an exterior layer including a decorative surface treatment. The panel covering also includes an interior base layer including a polymer material coupled to the exterior layer. The panel covering also includes a reinforcing layer including a porous web installed between the exterior layer and the interior layer. The polymer material may include polyethylene terephthalate or PET. A method of forming a panel covering is also disclosed.

40 Claims, 7 Drawing Sheets

U.S. PATENT DOCUMENTS

| | | | |
|---|---|---|---|
| 4,627,199 A | 12/1986 | Capaul | 52/145 |
| 4,630,416 A | 12/1986 | Lapins et al. | 52/239 |
| 4,671,841 A | 6/1987 | Stephens | 156/292 |
| 4,702,951 A | 10/1987 | Rooklyn | 428/193 |
| 4,729,917 A | 3/1988 | Symdra et al. | 428/190 |
| 4,861,535 A | 8/1989 | Due et al. | 264/103 |
| 4,862,659 A | 9/1989 | Wilson et al. | 52/221 |
| 4,878,826 A | 11/1989 | Wendt | 425/384 |
| 4,883,697 A | 11/1989 | Dornbusch et al. | 428/35.7 |
| 4,949,518 A | 8/1990 | Nagel et al. | 52/239 |
| 4,970,838 A | 11/1990 | Phillips | 52/250 |
| 4,989,688 A | 2/1991 | Nelson | 181/287 |
| 5,009,043 A | 4/1991 | Kurrasch | 52/145 |
| 5,015,034 A | 5/1991 | Kindig et al. | 297/227 |
| 5,022,336 A | 6/1991 | Iwase | 112/304 |
| 5,039,177 A | 8/1991 | Newell et al. | 312/111 |
| 5,045,377 A * | 9/1991 | Amata | 428/107 |
| 5,082,609 A | 1/1992 | Rohrlach et al. | 264/46.4 |
| 5,137,111 A | 8/1992 | Diduck et al. | 181/295 |
| 5,178,939 A | 1/1993 | Caldwell | 428/296 |
| 5,185,197 A | 2/1993 | Nixon | 428/246 |
| 5,238,515 A | 8/1993 | Insalaco et al. | 156/201 |
| 5,280,991 A | 1/1994 | Weiland | 296/214 |
| 5,292,476 A | 3/1994 | Jones | 264/46.6 |
| 5,295,342 A | 3/1994 | Roche et al. | |
| 5,295,725 A | 3/1994 | Jones | 296/97.1 |
| 5,298,694 A | 3/1994 | Thompson et al. | 181/286 |
| 5,348,798 A | 9/1994 | Berghuis et al. | 428/285 |
| 5,362,527 A | 11/1994 | Harpell et al. | 528/33 |
| 5,384,999 A | 1/1995 | Roche et al. | |
| 5,404,687 A | 4/1995 | Blake et al. | 52/600 |
| 5,407,522 A | 4/1995 | Insalaco et al. | 156/465 |
| 5,413,661 A | 5/1995 | Spengler et al. | 156/515 |
| 5,415,554 A | 5/1995 | Kempkers et al. | 439/34 |
| 5,466,317 A | 11/1995 | Lause et al. | 156/79 |
| 5,472,781 A | 12/1995 | Kim et al. | 428/364 |
| 5,484,186 A | 1/1996 | Van Order et al. | 296/97.5 |
| 5,486,391 A | 1/1996 | Tyner | 428/44 |
| 5,492,591 A | 2/1996 | Herrmann et al. | 156/538 |
| 5,494,246 A | 2/1996 | McCarthy et al. | 248/221.11 |
| 5,500,164 A | 3/1996 | Livesay et al. | 264/459 |
| 5,502,942 A | 4/1996 | Gras et al. | 52/511 |
| 5,551,755 A | 9/1996 | Lindberg | 297/411.46 |
| 5,554,831 A | 9/1996 | Matsukawa et al. | 181/294 |
| 5,582,905 A | 12/1996 | Beck et al. | 428/286 |
| 5,591,289 A | 1/1997 | Sounders | 156/148 |
| 5,597,852 A | 1/1997 | Unger et al. | 521/48.5 |
| 5,606,832 A | 3/1997 | Keith et al. | 52/410 |
| 5,622,774 A | 4/1997 | Feldman et al. | 442/136 |
| 5,632,133 A | 5/1997 | Wyslotsky | 53/433 |
| 5,635,271 A | 6/1997 | Zafiroglu | 428/102 |
| 5,660,908 A * | 8/1997 | Kelman et al. | 478/74 |
| 5,665,295 A | 9/1997 | Takamoto et al. | 264/172.19 |
| 5,677,027 A | 10/1997 | Masuda et al. | 428/96 |
| 5,716,092 A | 2/1998 | Dellinger et al. | 296/97.1 |
| 5,724,783 A | 3/1998 | Mandish | 52/745.05 |
| 5,744,763 A | 4/1998 | Iwasa et al. | 181/286 |
| 5,763,043 A | 6/1998 | Porter et al. | 528/109 |
| 5,773,375 A | 6/1998 | Swan et al. | 442/340 |
| 5,806,258 A | 9/1998 | Miedema et al. | 52/220.7 |
| 5,809,723 A | 9/1998 | Keith et al. | 52/405 |
| 5,816,005 A * | 10/1998 | Han | 52/391 |
| 5,817,408 A | 10/1998 | Orimo et al. | 428/218 |
| 5,823,611 A | 10/1998 | Daniel et al. | 296/214 |
| 5,830,311 A * | 11/1998 | Braun et al. | 156/471 |
| 5,833,796 A | 11/1998 | Matich | 156/285 |
| 5,841,081 A | 11/1998 | Thompson et al. | 181/286 |
| 5,871,857 A * | 2/1999 | Alhamad | 428/703 |
| 5,899,025 A | 5/1999 | Casey et al. | 52/36.1 |
| 6,247,280 B1 * | 6/2001 | Grinshpun et al. | 52/309.12 |
| 6,263,629 B1 * | 7/2001 | Brown, Jr. | 52/309.16 |

* cited by examiner

FIG. 17

PARTITION WALL SYSTEM

CROSS-REFERENCE TO RELATED APPLICATIONS

The following U.S. patents are cited by reference and incorporated by reference herein: (a) U.S. Pat. No. 5,899,035 titled "KNOCK-DOWN PORTABLE PARTITION SYSTEM"; (b) U.S. Pat. No. 5,899,025 titled "FURNITURE SYSTEM"; (c) U.S. Pat. No. 2,456,319 titled "POLYMERIC LINEAR TERFPHTHALIC ESTERS".

FIELD OF THE INVENTION

The present invention generally relates to a panel section for use in a work environment. In particular, the present invention relates to a panel section for use in a partition wall system. More particularly, the present invention relates to a panel section having a polymer layer with a reinforcing layer.

BACKGROUND

It is known to provide a partition wall system for use in a work environment for creating individual or group spaces. Such partition wall system typically includes a panel section made of an internal, rigid, structural frame, typically made of a metal material. Exemplary partition wall systems include the Avenire®, Series 9000®, Answer® and Montage® systems furniture commercially available from Steelcase Inc. Other exemplary partition wall systems are shown in U.S. Pat. No. 5,899,035 titled "KNOCK-DOWN PORTABLE PARTITION SYSTEM" and U.S. Pat. No. 5,899,025 titled "FURNITURE SYSTEM", the disclosures of which are hereby incorporated by reference.

In such known partition wall systems, the frame typically includes parallel top and bottom members joined in a perpendicular arrangement with parallel side members (e.g., by common joining methods such as the use of fasteners or welding) in a rectilinear or "picture frame" configuration. (One or more cross members spanning between the top member and the bottom member and/or side members may also be provided for support.) The frame may be "open" (e.g., having a central open space) or may be wholly or partially "filled" by a solid sheet or other material. An insert or covering panel, commonly referred to as a "cover panel", tile or skin, is typically installed or fastened (e.g., temporarily or permanently) on the frame. The cover panel may be provided with a decorative and/or functional surface treatment, and may be further covered by another layer (e.g., a functional or decorative fabric, covering, coating, etc.).

It is also known to incorporate a polymer (e.g., polyester-based material) such as poly(ethylene terephthalate) material (commonly referred to as polyester or "PET") in an acoustical panel covering for a panel section of a partition wall system. The chemical properties and chemical structure of PET and related materials are well known and described, for example, in U.S. Pat. No. 2,456,319 and in various other reference works. PET is relatively inexpensive, commonly available and recyclable, and is believed to provide sound absorption or sound-deadening properties when used as a panel covering. However, such known acoustic panel coverings incorporating PET material may not perform within certain desired criteria during an extreme thermal event such as extreme temperature or fire conditions, due in part to the lack of suitable structural and thermal barrier arrangement.

Accordingly, it would be advantageous to provide a partition wall system including panel sections with one or more panel coverings formed of a polymer material (such as PET) and including a structural barrier layer. It would also be advantageous to provide a provide a partition wall system including a panel covering having a porous reinforcing layer and a polymer material (such as polyethylene terephthalate) shaping layer capable of being formed into various shapes with sharp or smooth edges. It would also be advantageous to provide a partition wall system including a panel covering made from a recycled PET material. It would also be advantageous to provide a panel covering that is recyclable. It would also be advantageous to have a partition wall system that provides visual and/or acoustical privacy. It would further be advantageous to provide a partition wall system including any one or more of these or other advantageous features.

SUMMARY OF THE INVENTION

The present invention relates to a panel covering for use in an office environment. The panel covering includes an exterior layer including a decorative surface treatment. The panel covering also includes an interior base layer including a polymer material coupled to the exterior layer. The panel covering also includes a reinforcing layer including a porous layer installed between the exterior layer and the interior layer.

The present invention also relates to a partition wall system for dividing space in an office environment. The wall system includes a generally rigid frame including horizontal beams and vertical posts. The wall system also includes a panel covering adapted for coupling to the frame. The panel covering includes an exterior layer including a decorative surface treatment. The panel covering also includes an interior base layer including a polymer material coupled to the exterior layer. The panel covering also includes a reinforcing layer including a mesh screen having a plurality of apertures installed between the exterior layer and the interior layer. The apertures of the screen have an opening of less than about 9 inch$^2$.

The present invention also relates to a method of forming a panel covering. The covering includes an exterior layer including a decorative surface treatment. The covering also includes an interior base layer including a PET material coupled to the exterior layer. The covering also includes a reinforcing layer including a mesh screen installed between the exterior layer and a backing layer. The method includes applying the screen on the exterior layer. The method also includes applying the PET material on the screen. The method also includes applying a backing layer to the PET material. The method also includes heating the PET material thereby softening the material. The method also includes applying pressure to the softened PET material. The method also includes shaping the softened PET material.

DETAILED DESCRIPTION OF PREFERRED AND OTHER EXEMPLARY EMBODIMENTS

Figure 1:
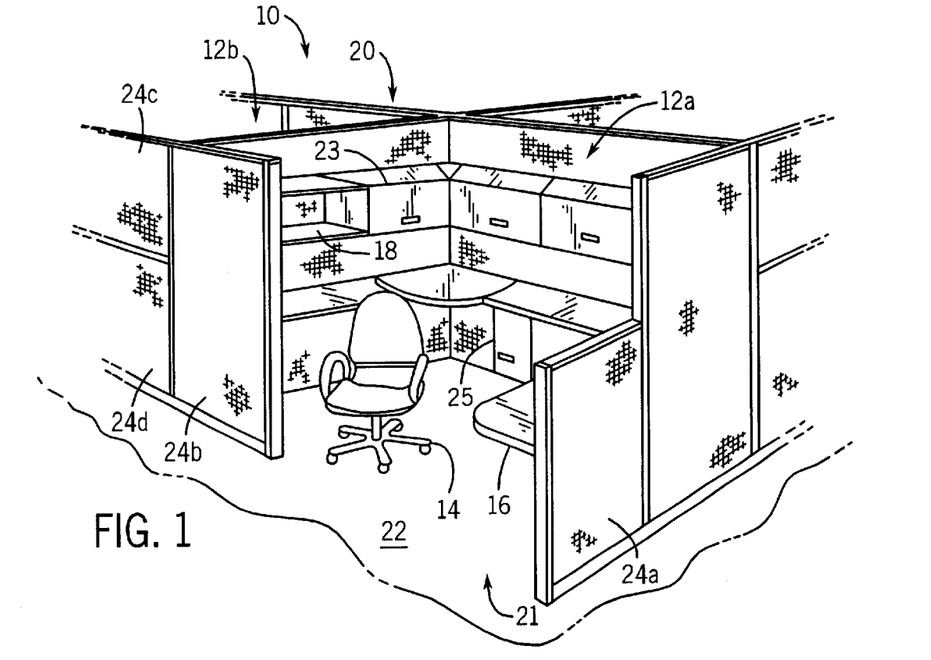
FIG. 1 is a perspective view of a work environment according to an exemplary embodiment of the present invention.

Referring to FIG. 1, an exemplary arrangement of a partition wall system 20 is shown according to an exemplary embodiment in a work environment 10. Wall system 20 divides work environment 10 into multiple work areas (shown as a work area 12a and a work area 12b). Wall system 20 may provide both visual and/or acoustical privacy. Wall system 20 includes multiple panel sections 24a, 24b, 24c and 24d, which can be interconnected both laterally (e.g., panel section 24c and 24d) and in a secure vertical "stacked" fashion (e.g., panel section 24a and 24b). The panel sections may be arranged in various heights relative to a floor 22, such as a "partial" height (e.g., panel section 24a), an intermediate height (e.g., panel section 24b), and a full height (spanning from floor 22 to a ceiling, not shown). Panel sections 24a through 24d are shown having a planar rectangular shape, but may be of any shape (e.g., curved, circular, triangular, etc.) according to alternative embodiments. A covering web or insert skin (shown as a cover panel 40 in FIG. 2) is included on one or both sides of each of the panel sections.

Figure 2:
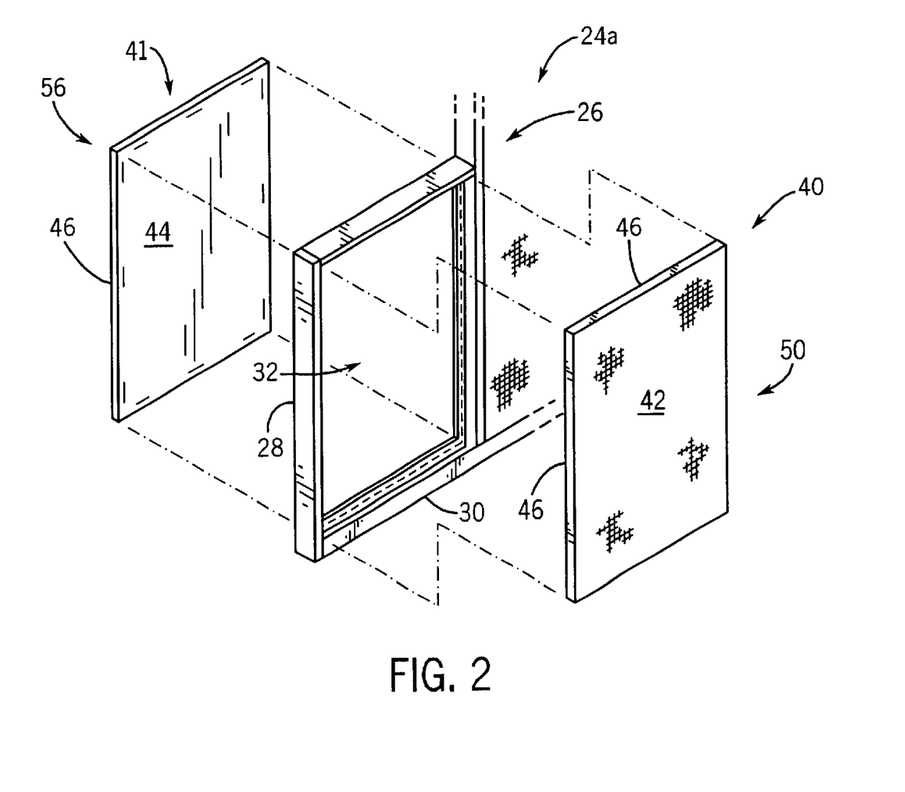
FIG. 2 is a fragmentary exploded perspective view of a panel section of the work environment of FIG. 1 according to an exemplary embodiment.

According to an exemplary embodiment as shown in FIG. 2, panel section 24a includes an interior structural frame 26 having a rigid or semi-rigid orthogonal or rectilinear "picture frame" configuration. Frame 26 is formed from vertical posts 28 and beams 30 (shown as rectangular metal blocks or tubes) coupled by a weld (or alternatively any of a wide variety of other coupling or fastening arrangements, such as by screw, bolt, etc.). Frame 26 is intended to rest or be supported by a surface such as floor 22, or may be elevated from floor 22 by a caster (not shown) or a foot 38 (see FIG. 17) on another frame. As shown in FIG. 1, the frame of each adjacent panel section can be attached to a supplemental support such as a mounting structure (shown as a vertical upright 36 in FIG. 17) to securely attach at least two adjacent panel sections to each other (e.g., vertical upright 36 may attach panel section 24b to adjacent panel section 24d by tabs 134 configured for insertion into corresponding slots 136 of frame 26). According to an alternative embodiment, a linking member may be used to interconnect adjacent panel sections. According to a preferred embodiment, the frame is preferably made from a material having a relatively low combustion capacity such as steel. The frame may be of sufficient strength to be load-bearing to support accessories (e.g., binder bins, work surfaces, etc.).

Work area 12a may be provided with a variety of accessories commonly used by workers in their tasks, for example: a worksurface 16 and an overhead shelf 18 as shown in FIG. 1; storage units (shown as an overhead cabinet 23 and a floor supported cabinet 25 in FIG. 1); and a seating product (shown as a task chair 14). An opening or portal 21 (e.g., doorway) spaced between adjacent panel sections 24a and 24b provides access for ingress and egress to work area 12a.

FIG. 2 further shows frame 26 attached to cover panel 40 (shown facing toward an interior floor space 27 of work area 12a in FIG. 1) and a cover panel 41 (shown facing toward an exterior floor space or hallway of work area 12a in FIG. 1). Cover panels 40 and 41 each include a sheet or septum of material (shown as a face sheet 50) spanning from each horizontal beam 30 of frame 26, which covers or obscures a central aperture (shown as an opening window 32) of frame 26 or may cover a covering sheet 34 mounted to frame 26 (see FIG. 17). Face sheet 50 includes an exterior surface 42 and an interior surface 44, which are each intended to be viewed from either side of frame 26. According to an alternative embodiment, the interior surface of the face sheet may be concealed from view when mounted to a wall (e.g., a structural or architectural wall). Face sheet 50 also includes a side edge 46, which may be positioned within an interior of frame 26, or which may be positioned "flush" with beam 30 or post 28 of frame 26. A depending leg 54 of cover panel 40 extends downwardly from edge 46 of face sheet 50, and a flange or tongue (shown as a lip 52) may extend perpendicularly from leg 54 (as shown in FIGS. 6 through 9). Cover panels 40 and 41 are shown having a rectangular shape, but may be of any variety of desired shapes (e.g., curved, round, circular, etc.) according to alternative embodiments.

Cover panel 40 is preferably semi-rigid and compliant such that face sheet 50 may be slightly deformed before or during mounting to frame 26. Once mounted to frame 26, cover panel 40 "reforms" to its original configuration (e.g., cover panel 40 has a "spring" effect). Such "spring" effect tends to enhance the holding force of frame 26 against cover panel 40 (see FIG. 6). Cover panel 40 is preferably made of a material configurable to enhance and capitalize on the deformable properties to provide such "spring" effect.

Figure 3:
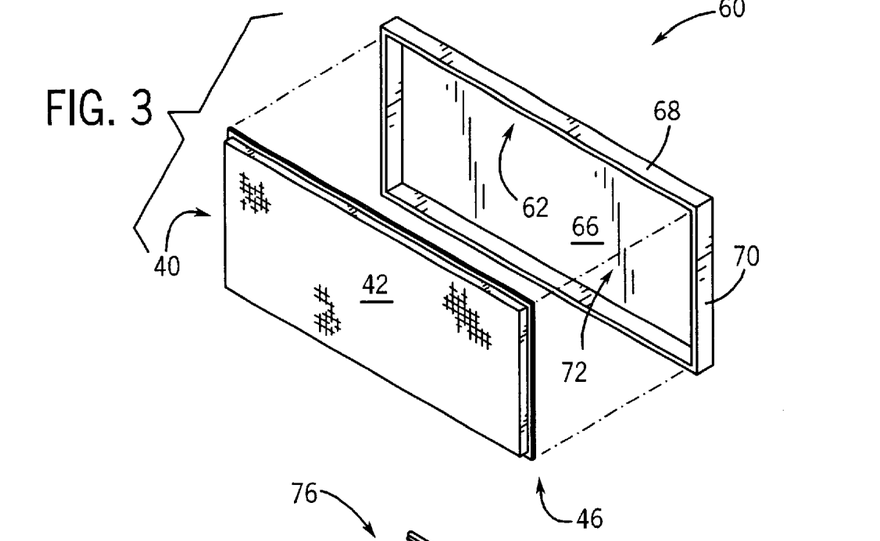
FIG. 3 is an exploded perspective view of a panel section according to an alternative embodiment.
Figures 6, 7:
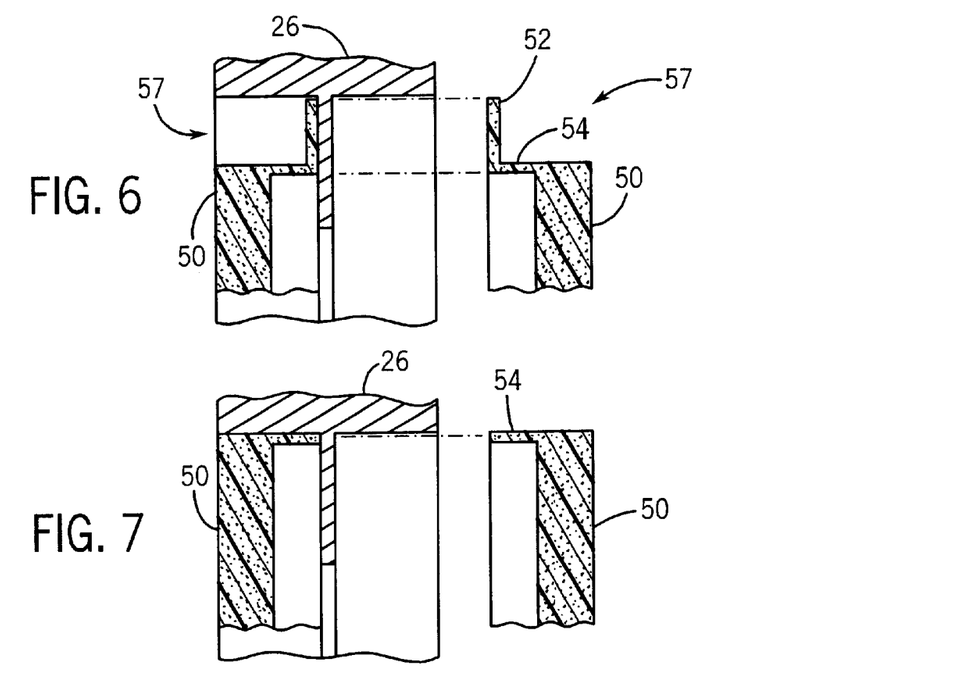
FIG. 6 is a fragmentary sectional view of a panel section according to a preferred embodiment.
FIG. 7 is a fragmentary sectional view of a panel section according to an alternative embodiment.
Figure 8:
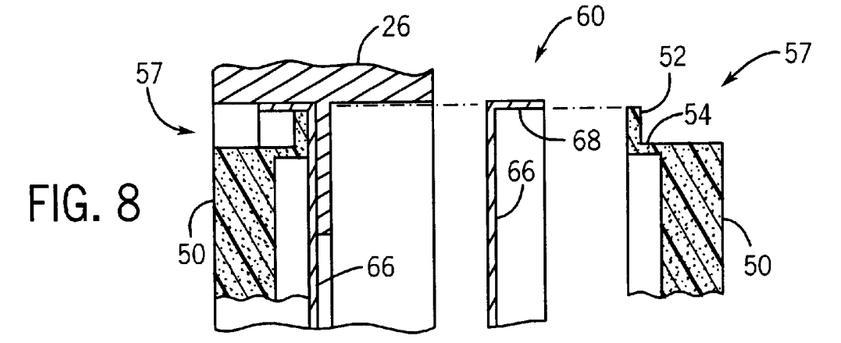
FIG. 8 is a fragmentary sectional view of a panel section according to an alternative embodiment.

As is known to those of skill in the art who review this disclosure, there are a wide variety of arrangements for mounting a cover panel to a frame or a mounting structure. For example, a housing or supplemental frame (shown as a pan 60) for mounting to cover panel 40 is shown in FIG. 3. Pan 60 includes a horizontal frame member 68 and a vertical frame member 70 (similar to post 28 and beam 30 shown in FIG. 2). A turned rim 62 of pan 60 extends perpendicularly from a backing sheet 66 of pan 60. Rim 62 forms a recessed cavity 72 for receiving interior surface 44 of an inserted cover panel 40 (e.g., edge 46 of cover panel 40 is placed in cavity 72 and abuts against rim 62 such that face sheet 50 is "flush" with, or extends slightly beyond, rim 62). Cover panel 40 may be slightly deformed before insertion into cavity 72, and subsequently "sprung" back into its original configuration such that rim 62 provides a holding force sufficient to retain cover panel 40 in pan 60. Thus, cover panel 40 may be held in an interference of friction fit within frame 26 (see FIG. 6) or pan 60 (see FIG. 8), and an adhesive such as glue may assist in attaching the cover panel to the pan according to an alternative embodiment. As shown in FIG. 8, lip 52 may extend slightly away from rim 62 to form a peripheral gap 57 between rim 62 and edge 46 of face sheet 50. According to an alternative embodiment as shown in FIG. 7, cover panel 40 need not include lip 52 such that edge 46 of face sheet 50 abuts against frame 26 and substantially no peripheral gap is formed.

Figures 4, 5:
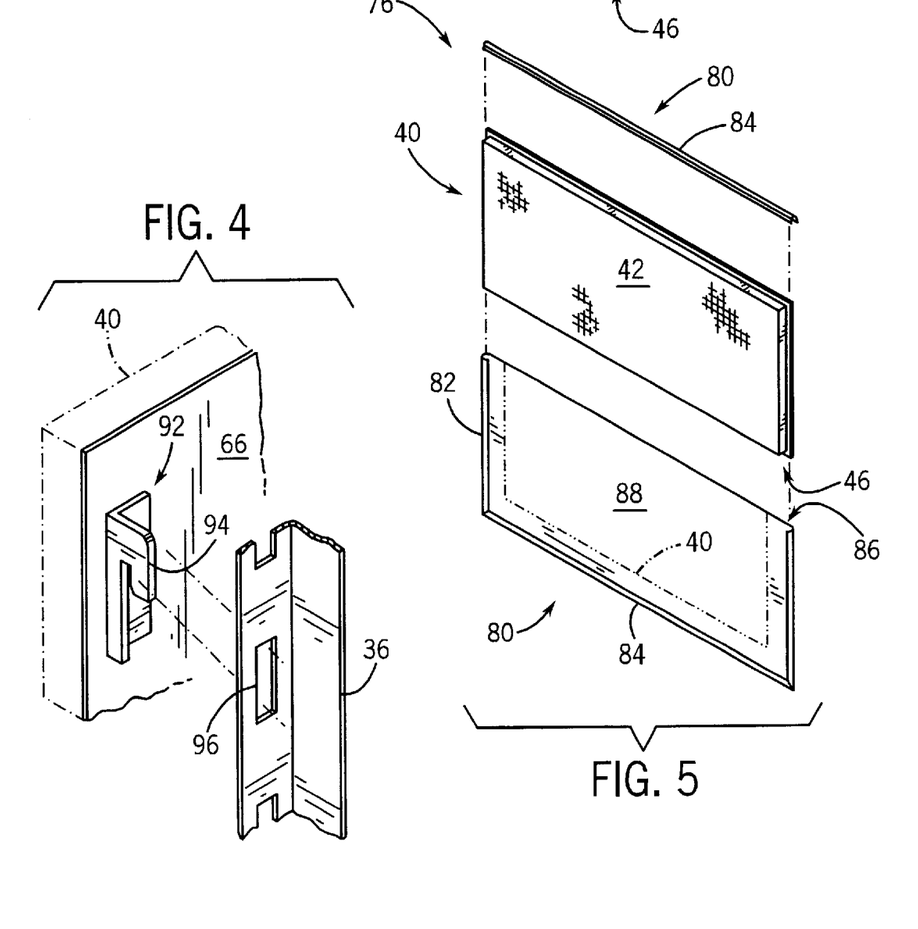
FIG. 4 is a fragmentary exploded perspective view of a panel covering adapted for attachment to a frame according to an exemplary embodiment.
FIG. 5 is an exploded perspective view of a panel section according to an alternative embodiment.
Figure 9:
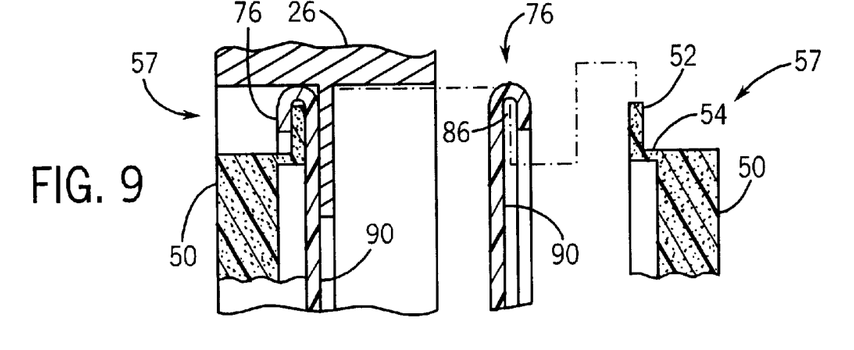
FIG. 9 is a fragmentary sectional view of a panel section according to an alternative embodiment.

A supplemental slotted frame 76, an alternative embodiment of pan 60, is shown in FIG. 5. Slotted frame 76, like pan 60, includes a horizontal frame member 80 and a vertical frame member 82. A turned or rolled rim 84, similar to rim 62 of pan 60, provides a groove (shown as a slot 86) for retaining cover panel 40. Lip 52 of cover panel 40 may be inserted within slot 86 so that interior surface 44 of cover panel 40 is in a facing relationship to a backing sheet 90, similar to backing sheet 66 of pan 60 shown in FIG. 4. A central opening or aperture 88 may be circumscribed by frame member 80 and frame member 82 so that either interior surface 44 or exterior surface 42 may be visible when slotted frame 76 is mounted to frame 26. The selective insertion and removal of cover panel 40 in/from slotted frame 76 (and slotted frame 76 in/from frame 26) is shown in FIG. 9.

Figure 17:
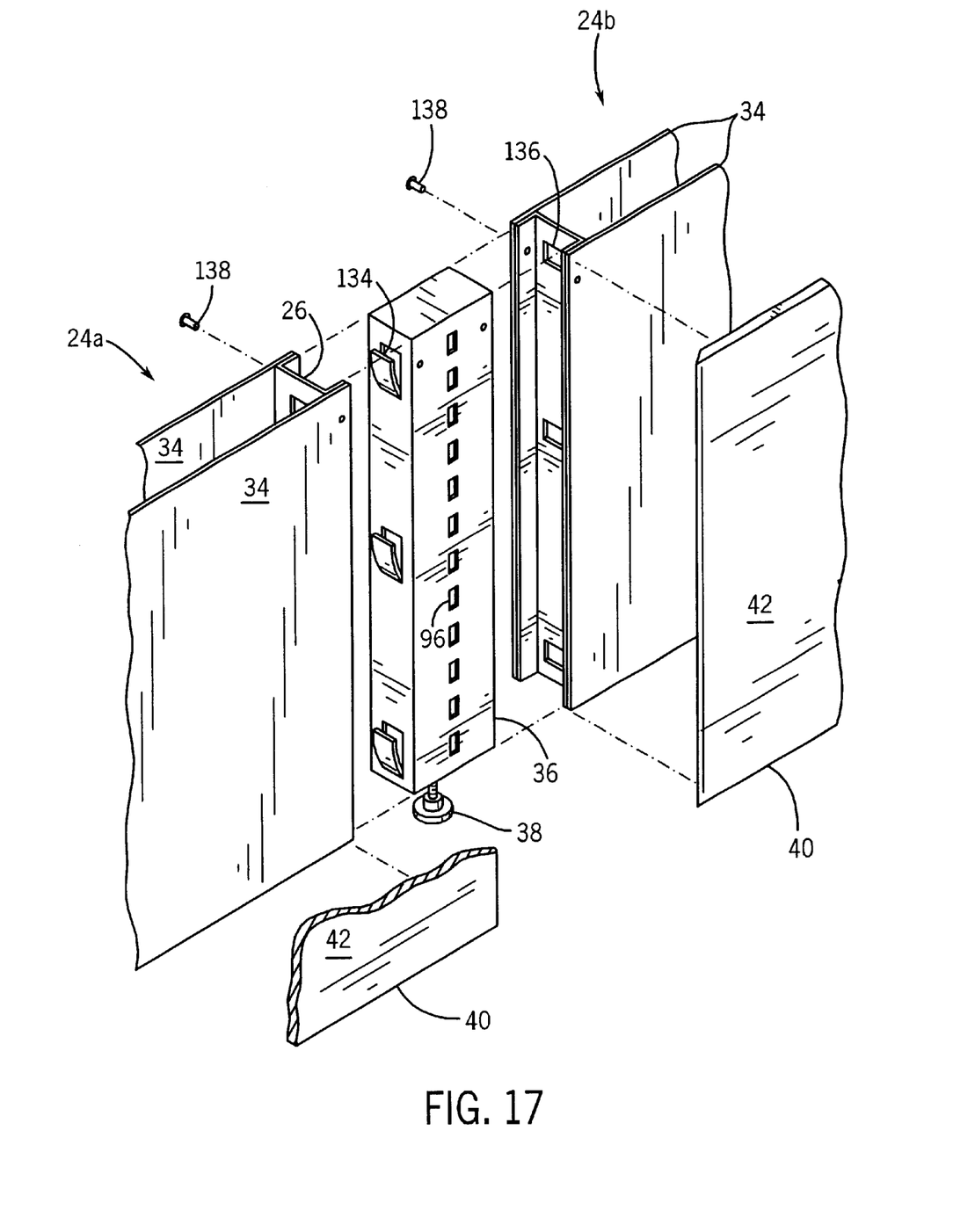
FIG. 17 is a fragmentary perspective view of a partition wall system according to an alternative embodiment.

According to an alternative embodiment as shown in FIG. 4, a mounting clip 92 may be attached to pan 60 (or to interior surface 44 of cover panel 40). Mounting clip 92 is configured for attachment to vertical upright 36 or other structural element (e.g., frame, mounting post, etc.). Mounting clip 92 includes a fastener (shown as a hook 94) configured for attachment to an aperture (shown as a slot 96) of vertical upright 36. Hook 94 is securely received and retained within slot 96 of vertical upright 36. According to another alternative embodiment, a spring clip may attach cover panel 40 to a mounting structure. The spring clip may be made of a compliant (e.g., spring-like, deflectable or deformable plastic or like resiliency) material and may be pressed under force within an aperture of the mounting structure and be thereby retained against a "pull-out" force (up to a certain threshold value) required to deform and thereby remove the spring clip from the corresponding aperture. Once pressed into the corresponding aperture, the spring clip may provide a locking and holding effect. According to alternative embodiments, the arrangement of apertures and mounting clips and cover panels can be reversed, or other arrangements for securing cover panels to a frame and/or mounting structure can be employed. By employing more of the spring clips, a greater overall holding force or more secure attachment can be provided for the cover panels. According to other alternative embodiments, cover panel 40 may be attached to frame 26 or pan 60 by another fastener (e.g., a Velcro™ fastener, tape, glue, screw 138 as shown in FIG. 17, etc.).

Figure 10:
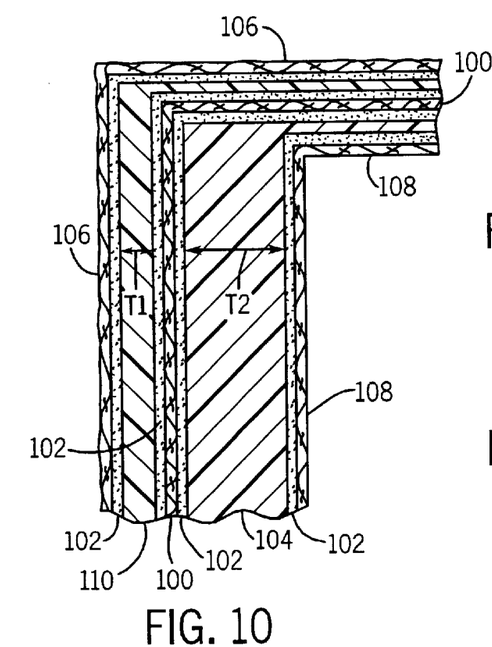
FIG. 10 is a fragmentary sectional view of a panel covering according to an exemplary embodiment.
Figure 11A:
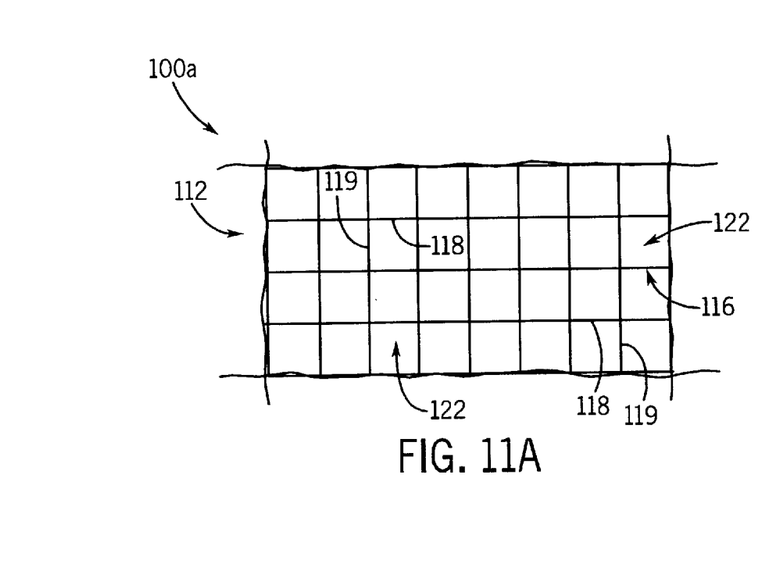
FIG. 11A is a top plan view of a reinforcing layer according to an exemplary embodiment.
Figure 11B:
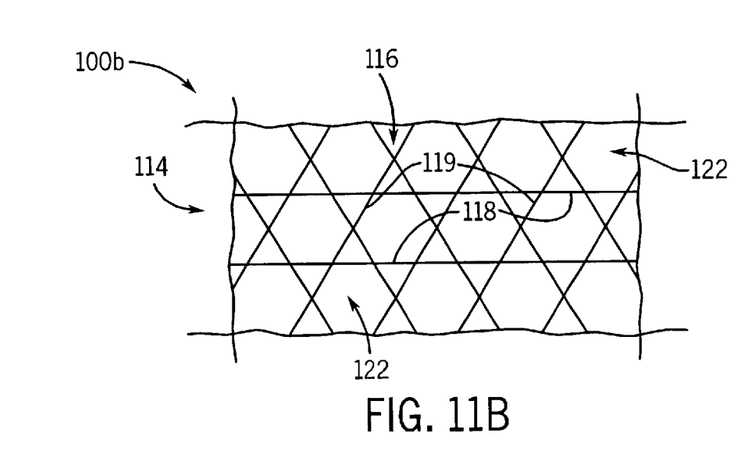
FIG. 11B is a top plan view of a reinforcing layer according to an alternative embodiment.

FIG. 10 shows that cover panel 40 may be constructed from a variety of layers or sheets of material. An exterior layer (shown as an upholstery fabric layer 106) may be attached to an interior base polymer or thermoplastic layer (shown as a compressed polyethylene terephthalate or PET layer 110) by an adhesive layer 102 such as a hot-melt thermoplastic or thermoset adhesive. Compressed PET layer 110 may be attached to a top side 112 of a reinforcing web stratum or porous mesh planar layer (shown as a perforated screen 100a in FIG. 11A and a perforated screen 100b in FIG. 11B) by adhesive layer 102. A bottom side 114 of screen 100 may be attached to an uncompressed PET layer 104 by adhesive layer 102. (Compressed PET layer 110 is shown having a thickness $T_1$ less than a thickness $T_2$ of uncompressed PET layer 104.) A backing layer 108 may be attached to uncompressed PET layer 104 by adhesive layer 102. According to a preferred embodiment, the cover panel may include only a single layer of PET (e.g., the uncompressed PET layer and associated adhesives may be omitted from the cover panel).

Compressed PET layer 110 is useful for a variety of functional purposes.

One such functional purpose includes the retention of mounting pins such as thumbtacks, pins, staples, etc. for the mounting of accessories (such as paper) to the cover panel. The thickness of the PET layer may be varied to accommodate mounting pins of different lengths and sizes. Another such functional purpose includes acoustical dampening to reduce transmission of sound by absorbing the sound energy in work environment 10. For example, compressed PET layer 110, because of its densified thickness, may provide a greater sound-deadening or sound absorption capacity than uncompressed PET layer 104. Uncompressed PET typically has a "fluffy", fibrous texture made of woven or non-woven fibers and is otherwise similar to compressed layer 110.

Fabric layer 106 is intended to be attached to exterior surface 42 of cover panel 40. Fabric layer 106 may be provided with a variety of decorative surface treatments (e.g., graphics display, colors, patterns, laminates, coatings, etc.) in a wide variety of combinations (i.e., with one area differing in whole or in part from another area of the fabric) that may be suited or adapted to a wide variety of functional purposes (e.g., space division, association with other areas and objects, communication of information, etc.) according to preferred and other alternative or exemplary embodiments. Backing layer 108 may be made from a material having a relatively low combustion capacity such as woven fiberglass or metal foil. According to an alternative embodiment, backing layer may include a vinyl or thermoplastic sheet of material.

The chemical production and physical properties of PET are described in, for example, U.S. Pat. No. 2,456,319. PET has a relatively low capacity for combustion (e.g., compared to a sheet of thin paper) and is typically retained in a "solid state" until it reaches a melting point (i.e., in the range of between about 254–258 degrees Celsius). PET does sometimes burn, but local melting of the PET is believed to generally inhibit the spread of flames. An alternative embodiment of PET suitable for the PET layer includes polymeric polymethylene terephthalates.

Screen 100 is typically made from a material having a relatively low capacity for combustion (i.e., compared to a sheet of thin paper) such as fiberglass or steel. Without intending to be limited to any particularly theory, it is believed that screen 100 has a positive effect on reducing the propagation of open burning combustion over exterior surface 42 of cover panel 40. Screen 100 includes a network of multiple structural elements or wires (shown as threads 116) having horizontal members 118 attached to vertical members 119 arranged in a "network" or "crisscross" configuration. Spaces or apertures (shown as a hole 122) are formed between vertical members 119 and horizontal members 118 to give screen 100 a net or lattice-like structure. Horizontal members 118 and vertical members 119 of screen 100 may be 30 connected together in a variety of methods such as weaving, spot welding, cinching, tying, etc.

Screen 100 tends to rigidify and reinforce the structural integrity of PET layer 110 when the PET is in a solid state or condition. PET layer 110 may be supported by screen 100 as shown in FIG. 10, or the PET layer may be fused, embedded and/or integrally attached to screen 100 such as by weaving or entanglement according to alternative embodiments. When an extreme thermal event takes place, the PET layer may begin to soften, melt or plasticize. When the PET layer begins to melt, screen 100 may serve as a "retention layer" and may assist in retaining the structural integrity of the PET layer (i.e., the surface tension of the PET keeps the PET layer intact). The PET layer may eventually "seep" or fall through hole 122 of screen 100. However, such seeping of the PET layer would occur at a rate generally less than if screen 100 were absent from cover panel 40. Accordingly, screen 100 may assist in keeping the PET layer intact during a thermal event, and may permit only a gradual degradation of the PET layer through hole 122 of screen 100.

Figure 11C:
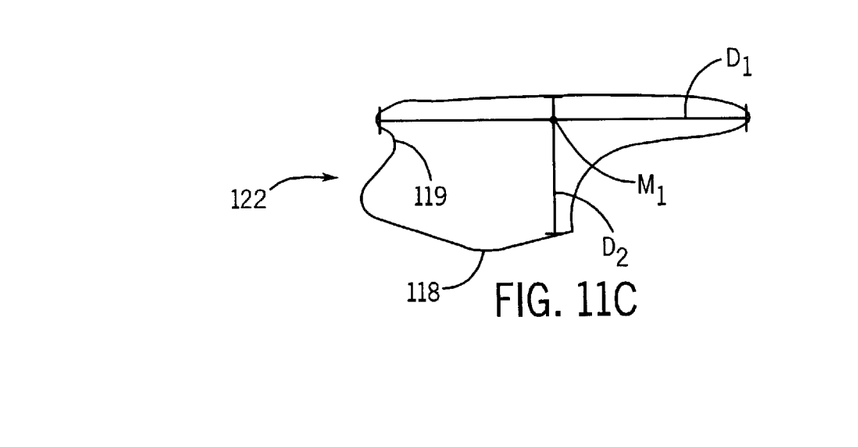
FIG. 11C is a top plan view of a hole of a reinforcing layer according to an alternative embodiment.

Referring to FIG. 11C, each hole 122 of screen 100 is shown having 15 a major diameter DI greater than any other diameter of hole 122, and a secondary diameter $D_2$ perpendicular to major diameter $D_1$ at a midpoint Ml of major diameter $D_1$ (e.g., hole 122 need not be symmetrical). According to a suitable embodiment, the average major diameter of all of the holes is greater than about 0.5 inch, more suitably greater than about 1 inch, most suitably less than about 3 inch. Each hole 122 has an effective average cross sectional area or opening area equal to ½ the distance of major diameter $D_1$ multiplied by secondary diameter $D_2$. According to a preferred embodiment, the average cross sectional area of hole is less than about 9 inch$^2$, suitably in the range of about 0.25 to 9 inch$^2$, more suitably about 1 to 9 inch$^2$. The average cross sectional area of hole 122 is preferably selected to be: greater than naught (in which case the PET layer may tend to act like a solid sheet during a thermal event, thereby possibly allowing molten PET to "pool" above the screen and possibly generate smoke due to the discharge of non-combustible and/or incompletely or partially combustible materials); and less than infinity (in which case the structural integrity of the PET layer tends not be retained by the screen during a thermal event and the PET layer tends to drop, seep or fall through the hole). The average cross sectional area of all the holes is at least about 50% relative to the surface area of the PET layer, more suitably about 60% to 90%, most suitably about 90 to 99.9%.

The average cross sectional area of hole 122 may also be defined by the number of generally parallel threads 116 per inch of screen 100. For example, poultry netting (e.g., commonly known as "chicken wire") typically has a hexagonal or rectangular shape with one horizontal member 118 and one vertical member 119 per inch of screen 100, and an average cross section area of about 1 inch$^2$. An 18×18 mesh (e.g., similar to surgical gauze) has eighteen horizontal members 118 and eighteen vertical members 119 per inch of screen 100, and an average cross sectional area in the range of about 3.1×10$^3$ inch$^2$ per hole. According to a preferred embodiment, the screen has a symmetrical (e.g., non-handed) pattern.

Screen 100 may include a variety of materials. According to a particularly preferred embodiment, screen 100 includes a fiberglass material with a resin binder. Fiberglass typically does not include "loose" wires and is easy to cut and handle in field. Further, fiberglass (like PET) is both formable and malleable and capable of being molded into a variety of shapes. According to an alternative embodiment, screen 100 includes a metal (e.g., steel, iron, etc.) wire. Like fiberglass and PET, metal wire is formable, malleable, and capable of being molded into a variety of shapes. Without intending to be limited to any particular theory, it is believed that a wire screen may serve as a flame or thermal inhibitor or barrier (e.g., the wire screen "sinks" heat and therefore may reduce the rate of flame spread). A wire screen may also provide a flexible, tackable layer (e.g., thumbtacks can penetrate the screen or holes of the screen for anchoring into a PET or other layer) or a magnetic surface for fastening accessories to the fabric layer. According to other alternative embodiments, the screen may include a flame resistant material such as KEVLAR® engineered para aramid polymer for short fiber reinforcement commercially available from E. I. du Pont de Nemours and Company of Wilmington, Del., or NOMEX® materials commercially available from E. I. du Pont de Nemours and Company of Wilmington, Del. According to other suitable embodiments, the screen may be a blend of PET and a fiberglass material. The screen materials may be relatively non-combustible and generally may have a relatively high melting point (e.g., about 1800° F. to 2800° F.).

The various layers of cover panel 40 preferably include malleable materials such that cover panel 40 may serve as a "shaping layer" and may be molded or shaped into a variety of configurations. To mold cover panel 40, the temperature of PET layer 110 may be elevated until PET layer 110 becomes soft and moldable (e.g., a slightly heated or "pre-melted" or plastic state at which the PET does not substantially fall through holes 122 of screen 100). Pressure may be applied when the PET layer is at such elevated temperature to compress, shape or mold the softened PET into a densified, compressed PET layer. Such compression of the PET layer assists in giving the cover panel a smooth, substantially wrinkle and "pucker" free surface, and for forming edges (e.g., with a relatively high density) for beveled or sharp edges. Accordingly, cover panel 40 may be molded into any shape, including the rectangular shape shown in FIG. 2. During the molding process, edge 46 and face sheet 50 of cover panel 40 may be formed to have a sharp or smooth contour. The forming of edge 46 may result in the formation of a corner section 56, such that leg 54 is generally perpendicular to exterior surface 42 of face sheet 50.

Figure 12A:
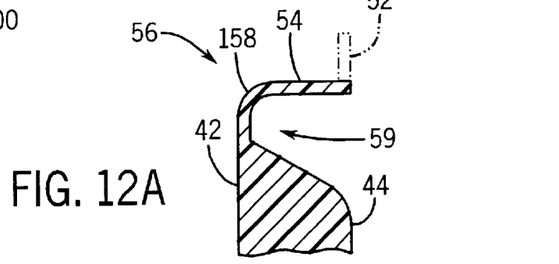
FIG. 12A is a fragmentary sectional view of a corner section of a panel covering according to an alternative embodiment.
Figure 12B:
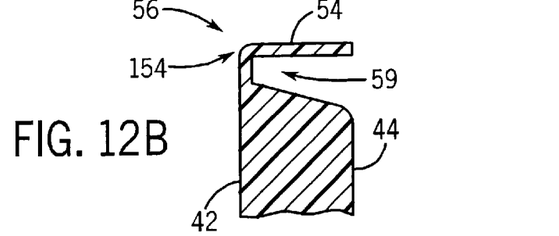
FIG. 12B is a fragmentary sectional view of a corner section of a panel covering according to an alternative embodiment.
Figure 12C:
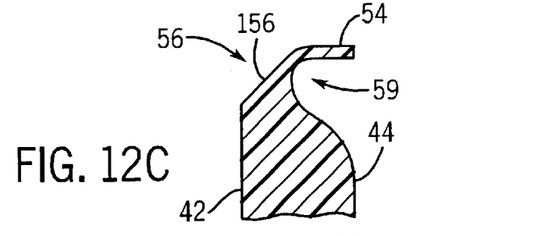
FIG. 12C is a fragmentary sectional view of a corner section of a panel covering according to an alternative embodiment.
Figure 12D:
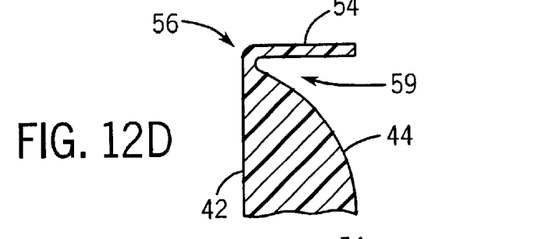
FIG. 12D is a fragmentary sectional view of a corner section of a panel covering according to an alternative embodiment.
Figure 12E:
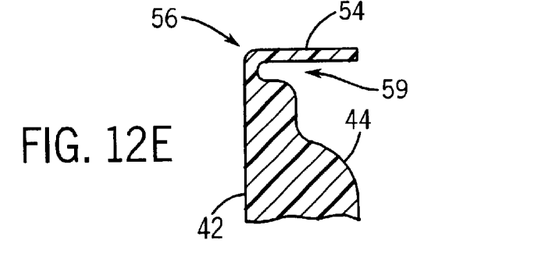
FIG. 12E is a fragmentary sectional view of a corner section of a panel covering according to an alternative embodiment.

Referring to FIGS. 12A through 12E, corner section 56 includes an exterior corner 58 contiguous with exterior surface 42 of face sheet 50, and an interior corner 59 contiguous with interior surface 44 of face sheet 50. Exterior corner 58 may include a sharp orthogonal angle 154 (as shown in FIG. 12B), a slightly angled corner 156 (as shown in FIG. 12C) and an intermediately angled corner 158 (as shown in FIG. 12A). Pressing or molding the interior surface 44 of cover panel 40 typically forms corner section 56. Accordingly, the interior corner may include a variety of shapes such as curved (see FIGS. 12A and 12C), linear (see FIG 12B), sharply pointed or apexed (FIG. 12D), steeply and broadly curved (see FIG. 12E) or combinations thereof.

Figures 14, 15, 16:
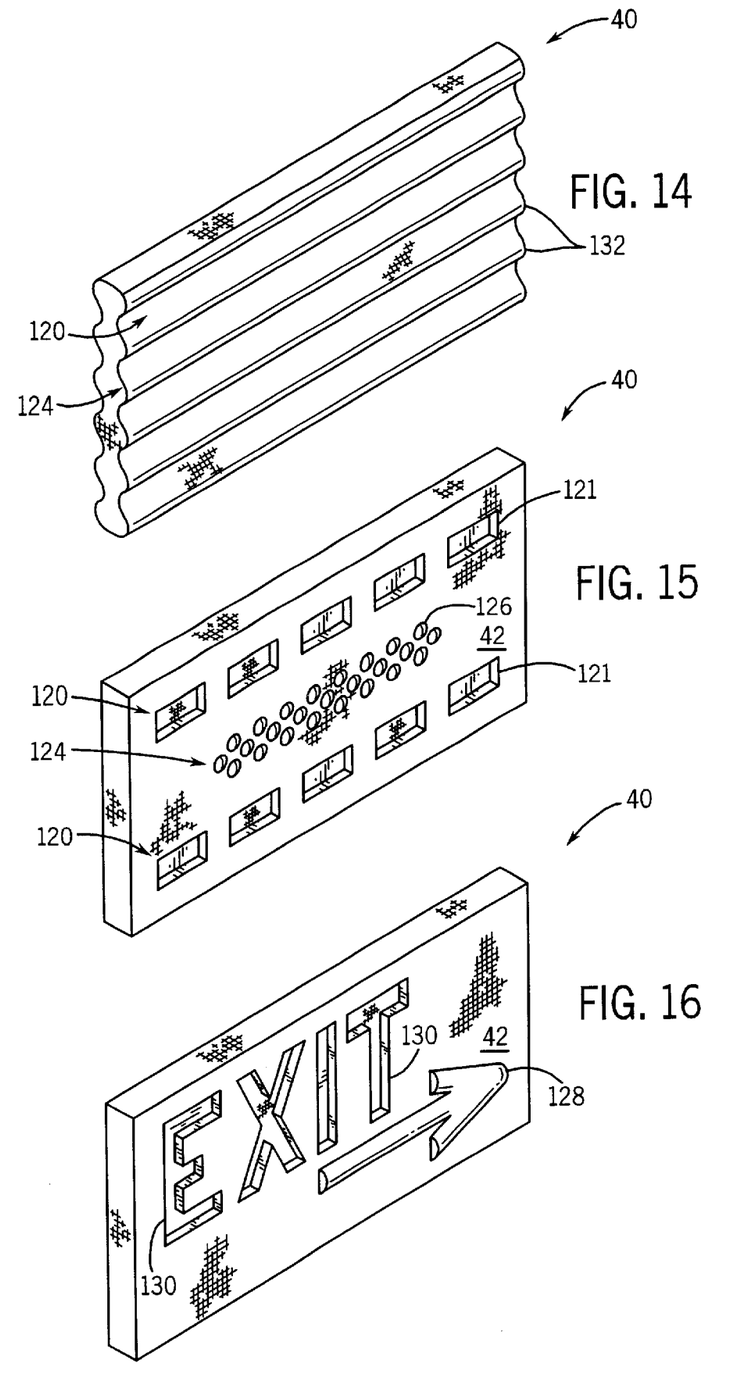
FIG. 14 is a perspective view of a panel covering according to an alternative embodiment.
FIG. 15 is a perspective view of a panel covering according to an alternative embodiment.
FIG. 16 is a perspective view of a panel covering according to an alternative embodiment.

Cover panel 40 may also be molded to include decorative or functional protrusions 124 and depressions 120 as shown in FIG. 15. Protrusions 124 may be of a variety of desired shapes such as circular or oval dimples 126, which extend outwardly from exterior surface 42 of face sheet 50. Depressions 120 may be of a variety of shapes such as a rectangular indentation 121 shown recessed within exterior surface 42 of cover panel 40. Cover panel 40 may include surface ornamentation including waves (shown as corrugations 132 in FIG. 14). Corrugations 132 are, in effect, alternating rows of protrusions 124 and depressions 120. As is evident in FIG. 14, both exterior surface 42 and interior surface 44 of cover panel 40 may be provided with depressions 120 and protrusions 124 such that the depression on one side or surface of cover panel 40 is the protrusion on the other side or surface of cover panel 40. Depressions 120 may be formed in cover panel 40 by embossment, micro embossment, press methods, ironing, etc. Embossment may provide any variety of simple or intricate shapes (shown as an arrow 128) or indicia (shown as text 130) (see FIG. 16). According to alternative embodiments, the protrusions and depressions may be fully or partially curved, rectilinear or any other shape.

Figure 13:
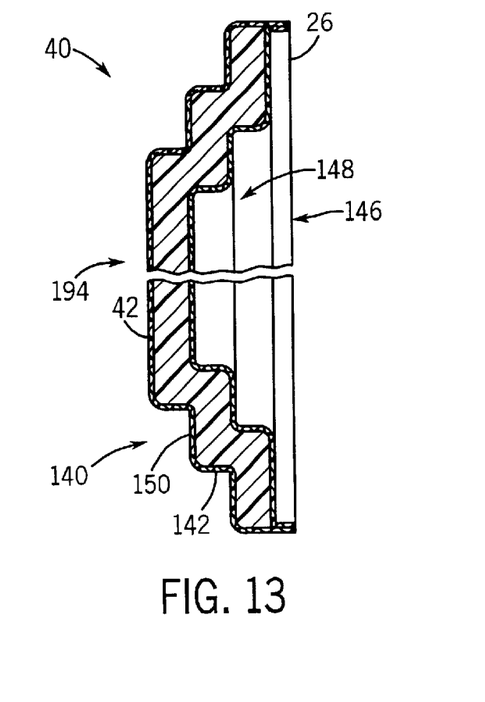
FIG. 13 is a sectional view of a panel covering according to an alternative embodiment.

Cover panel 40 may also be molded to include a variety of structures (e.g., functional, decorative, etc.). As shown in FIG. 13, cover panel 40 is shown having a sculpted structure including a convex side 144 opposite a concave side 146. The sculpted structure of cover panel 40 includes levels (shown as a step 140) intended to distance exterior surface 42 of cover panel 40 away from a mounting structure (such as a frame). Step 140 includes a horizontal stair 150 and a vertical riser 142 extending perpendicularly from stair 150. A recess 148 adjacent interior surface 44 provides a space between cover panel 40 and frame 26, which may be filled with a variety of materials such as sound absorbing materials or storage materials. According to an alternative embodiment, the convex surface of the cover panel may be mounted to the mounting structure so that the concave surface of the cover panel is visible to a viewer. surface of the face sheet may be concealed from view when mounted to a wall (e.g., a structural or architectural wall). Face sheet 50 also includes a side edge 46, which may be positioned within an interior of frame 26, or which may be positioned "flush" with beam 30 or post 28 of frame 26. A depending leg 54 of cover panel 40 extends downwardly from edge 46 of face sheet 50, and a flange or tongue (shown as a lip 52) may extend perpendicularly from leg 54 (as shown in FIGS. 6 through 9). Cover panels 40 and 41 are shown having a rectangular shape, but may be of any variety of desired shapes (e.g., curved, round, circular, etc.) according to alternative embodiments. apexed (FIG. 12D), steeply and broadly curved (see FIG. 12E) or combinations thereof.

EXAMPLE 1

A cover panel sample including a PET layer and a screen was tested for surface burning characteristics according to UL-723 (ASTM-E84) test procedure for "Surface Burning Characteristics of Burning Materials". The purpose of the test was to determine the comparative burning characteristics of the cover panel by evaluating the spread of flame over the cover panel surface and the optical or visual density of the smoke developed when exposed to a test flame. The test was conducted in a fire test chamber including a horizontal duct approximately 25 feet long. Windows were located along the duct so that the entire length of the sample could be observed from outside the fire test chamber. During the progression of the test, the fabric layer of the cover panel was the first element to be consumed by the flame. The size of the hole or opening of the screen, the material of the screen and the type of fabric layer were varied as shown in TABLE 1. The results of the test are shown in TABLE 1.

TABLE 1

| Screen Description | | Flame Spread Index | | | Smoke Density Index | | |
| --- | --- | --- | --- | --- | --- | --- | --- |
| Opening Size | Material | Actual | Rounded | Class | Actual | Rounded | Surface Fabric |
| 10 × 10 | Fiberglass[1] | 26.89 | 25 | I | 279.8 | 280 | Regatta[2] |
| 10 × 10 | Fiberglass[1] | 71.0[3] | 70 | II | 668.42 | 670 | Regatta[2] |
| 10 × 10 | Fiberglass[1] | 223.58 | 225 | IV | 223.58 | 225 | Regatta[2] |
| 12 × 12 | Steel | 37.8 | 40 | II | 254.45 | 255 | Barclay[4] |
| 12 × 12 | Steel | 49.85 | 50 | II | 457.16 | 455 | Barclay[4] |
| 12 × 12 | Steel | 31.64 | 30 | II | 357.33 | 355 | Regatta[2] |
| 3.5 mm × 3.5 mm[5] | Fiberglass | 22.95 | 25 | I | 276.55 | 275 | Regatta[2] |
| 3.5 mm × 4.0 mm[6] | Fiberglass | 29.45 | 30 | II | 277.46 | 275 | Regatta[2] |
| 12 × 12 | Steel | 17.33 | 15 | I | 284 | 285 | — |

[1]Permagaurd glass mesh commercially available from Sackner Products (a divison of Jason, Inc.) of Grand Rapids, Michigan.
[2]Regatta fabric commercially available from Guilford Mills, Inc. of Greensboro, North Carolina.
[3]71.0 FS remained @ 50.3 through 5-min, until secondary ignition occurred at floor of tunnel.
[4]Barclay (50% polyester; 50% modacrylic) fabric model no. 1012 available from Guilford Mills, Inc. of Greensboro, North Carolina.
[5]Model no. AM3000 fiberglass screen commercially available from Sackner Products (a divison of Jason, Inc.) of Grand Rapids, Michigan.
[6]Model no. T8506 commercially available from Sackner Products (a divison of Jason, Inc.) of Grand Rapids, Michigan.

EXAMPLE 2

A second set of cover panel samples including a PET layer and a screen were tested for surface burning characteristics according to UL-723 (ASTM-E84) test procedure for "Surface Burning Characteristics of Burning Materials". The size of the hole or opening of the screen, the material of the screen and the type of fabric layer were varied as shown in TABLE 2. The results of the test are shown in TABLE 2.

TABLE 2

| Screen Description | | Flame Spread Index | | | Smoke Density Index | | |
| --- | --- | --- | --- | --- | --- | --- | --- |
| Opening Size | Material | Actual | Rounded | Class | Actual | Rounded | Surface Fabric |
| 12 × 12 | Steel | 8.28 | 10 | I | 255.4 | 255 | Regatta |
| 12 × 12 | Steel | 14.81 | 15 | I | 312.38 | 310 | Regatta |
| 12 × 12 | Steel | 209.88 | 210 | IV | 351.05 | 350 | Barclay 1012 |
| 16 × 16 | Steel | 18.11 | 20 | I | 225.92 | 225 | Regatta |
| 18 × 18 | Steel | 21.89 | 20 | I | 273.9 | 275 | Regatta |
| 18 × 24 | Steel | 33.48 | 35 | II | 239.77 | 240 | Regatta |
| 18 × 24 | Steel | 32.12 | 30 | II | 228.37 | 230 | Regatta |
| 20 × 20 | Steel | 26.03 | 25 | I | 389.9 | 390 | Regatta |
| 20 × 20 | Steel | 24.39 | 25 | I | 198.32 | 200 | Regatta |
| 24 × 18 | Steel | 43.2 | 45 | II | 319.1 | 320 | Regatta |
| 24 × 24 | Steel | 50.9 | 50 | II | 258.48 | 260 | Regatta |
| Chicken Wire[1] | Steel | 6.26 | 5 | I | 285.83 | 285 | Regatta |

[1]Mesh size approximately 1" × 1" for this material.

The results of TABLE 2 show that a steel screen having a hole or opening size of about 12×12 performed better than a steel screen having a hole size of about 24×24. A steel screen having a hole or opening size similar to "chicken wire" performed particularly well. This was an unexpected result, as it would be expected that the more threads per inch in the screen would serve as a greater heat sink and thereby reduce flame spread. Without intending to be limited to any particular theory, it is believed that as the layers of the cover panel were assaulted by the flame, the screen appeared to keep the PET layer in place in certain samples, such that only the fabric layer immediately exposed to the advancing flame was burned substantially.

It is important to note that the construction and arrangement of the elements of the partition wall system in the exemplary embodiments is illustrative only. Although only a few exemplary embodiments of the present invention have been described in detail in this disclosure, those skilled in the art who review this disclosure will readily appreciate that many modifications are possible in the exemplary embodiments (such as variations in sizes, structures, shapes and proportions of the various elements, values of parameters, mounting arrangements, use of materials, orientations, colors, combinations of shapes, etc.) without materially departing from the novel teachings and advantages of the invention. For example, the cover panel materials may be used as part of a structural wall in a building, in furniture applications, and/or as an overhead or other liner in the interior of a vehicle (such as an automobile, boat, airplane, train, etc.). According to other alternative embodiments, the panel section may include a solid core constructed of wood or wood composite, or a foam or other composite materials (although a wide variety of other materials may also be used). Further, it is readily apparent that panel sections and cover panels can be made in any of a wide variety of shapes, sizes and thickness, densities, with a wide variety of weights and strengths, and can be incorporated into a wide variety of partition wall systems with a wide variety of types of covering cover panels or interconnections and cable management arrangements. According to an alternative embodiment, the PET layer may include a fibrous, woven or non-woven, fibrous thermoplastic resin substrate material. According to other alternative embodiments, the PET layer may include other thermoplastic materials. The thermoplastic materials can include, without limitation, polyesters, polyamides and polyolefins, polypropylene, polyethylenepolystyrene, polycarbonate, nylon, rayon, acrylic, etc. and , combinations thereof. A melt blown or other process may produce fibrous thermoplastic materials and blends. The thermoplastic materials may also include semi-synthetic filler fibers (such as acetate fibers), regenerated fibers (such as cupra and rayon), natural fibers (such as cotton and blends of cotton), and other fibers or combinations of natural or synthetic fibers. According to other alternative embodiments, the cover panel may be made of a sheet of another type of materials (such as a plastic, sheet molding compound, resin, resin-rich fabric, fiber, composite, fiber reinforced plastic) which can be formed by extrusion, pultrusion, vacuum forming, pressure forming, injection molding, blow molding or the like. In any preferred embodiment, the cover panel that forms the partition wall system will be of a material of suitable strength to provide both for a suitably rigid panel section (at least when constructed into the partition wall system) and for attachment of the cover panel. The PET may be wholly or partially recycled or "virgin" PET, and the panel covering may be wholly or partially recycled after use. Accordingly, all such modifications are intended to be included within the scope of the invention as defined in the appended claims.

What is claimed is:

1. A method of forming a panel covering including an exterior layer including a decorative surface treatment, an interior base layer including a polyethylene terephthalate material coupled to the exterior layer, a reinforcing layer including a mesh screen installed between the exterior layer and a backing layer, comprising:

applying the screen on the exterior layer;

applying the polyethylene terephthalate material on the screen;

applying the backing layer to the polyethylene terephthalate material;

heating the polyethylene terephthalate material thereby softening the material;

applying pressure to the softened material;

shaping the softened material.

2. The method of claim 1 further comprising removing excess polyethylene terephthalate material.

3. The method of claim 1 further comprising recycling the excess polyethylene terephthalate material.

4. The method of claim 3 further comprising sequentially applying the screen, applying the polyethylene terephthalate material and applying the backing layer.

5. A panel for use in a work environment comprising:
an exterior surface;
a first interior layer formed of a sheet of a polymer material;
a second interior layer comprising a web having a plurality of apertures;
wherein the web is a metal screen attached to the sheet of polymer material and forms a barrier to flame, and wherein the sheet of polymer material is at least semi-rigid so that the sheet and the web provide a structure for the exterior surface.

6. The panel of claim 5 wherein the web is configured to support the sheet when the polymer material is in a melted state.

7. The panel of claim 5 wherein the polymer material comprises polyethylene, terephthalate.

8. The panel of claim 5 further comprising a tackable material.

9. The panel of claim 5 wherein the web is a mesh.

10. The panel of claim 9 in the web is a network.

11. The panel of claim 10 further comprising a backing layer.

12. The panel of claim 11 wherein the backing layer comprises at least one of metal and fiberglass.

13. The panel of claim 12 further comprising a frame having a pair of horizontal beams and a pair of vertical posts.

14. The panel of claim 9 wherein the web is a sheet.

15. The panel of claim 14 wherein t he exterior surface is a sheet.

16. The panel of claim 15 wherein the exterior surface is a fabric.

17. The panel of claim 5 wherein the first interior layer is attached to the web by an adhesive.

18. The panel of claim 17 wherein the first interior layer is integral with the web.

19. The panel of claim 17 wherein the web is at least partially embedded in the first interior layer.

20. The panel of claim 5 wherein the apertures have an average major diameter of at least about 0.5 inch.

21. The panel of claim 5 wherein the apertures have an average opening area between about 0.25 and about 9 square inches.

22. The panel of claim 21 wherein the apertures have an average opening area between about 1 and about 9 square inches.

23. The panel of claim 22 wherein the opening area of the plurality of apertures covers about 90% to 99.90% of the surface area of the web.

24. The panel of claim 5 wherein the apertures have an orthogonal shape.

25. The panel of claim 5 wherein the web is a heat sink.

26. The panel of claim 25 wherein the web is a flame inhibitor.

27. The panel of claim 26 wherein the web is configured to reduce the rate of flame spread across the sheet.

28. The panel of claim 5 further comprising a third interior layer forming a sheet comprising polymer.

29. The panel of claim 5 wherein the polymer is at least partially molded.

30. The panel of claim wherein the polymer is at least partially densified.

31. The panel of claim 5 wherein the polymer comprises a plurality of molded protrusions and depressions.

32. A partition wall system for use in a work environment comprising:
a frame;
a panel at least partially within the frame, comprising:
an exterior surface;
a first interior layer formed of a sheet of a polymer material:
a second interior layer comprising a grid;
wherein the grid is configured to at least partially retain the second interior layer when the polymer is in a melted state.

33. The partition wall system of claim 32 wherein the polymer comprises polyethylene terephthalate.

34. The partition wall system of claim 32 further comprising a tackable layer.

35. The partition wall system of claim 32 wherein the grid is a screen.

36. The panel of claim 35 wherein the grid is a heat sink.

37. The panel of claim 36 wherein the grid is a flame barrier.

38. The panel of claim 37 wherein the grid is configured to reduce the rate of flame spread across the sheet.

39. The panel of claim 37 wherein the frame comprises a pair of horizontal beams and a pair of vertical posts.

40. The partition wall system of claim 32 wherein the grid is a mesh.

* * * * *